(12) United States Patent  (10) Patent No.: US 8,971,313 B2
Cheng et al.  (45) Date of Patent: Mar. 3, 2015

(54) METHOD, APPARATUS AND SYSTEM FOR UPDATING LOCATION INFORMATION OF AN IP ADDRESS

(75) Inventors: Yu Cheng, Shenzhen (CN); Guohui Ling, Shenzhen (CN); Yutao Li, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 248 days.

(21) Appl. No.: 13/410,027

(22) Filed: Mar. 1, 2012

(65) Prior Publication Data

US 2012/0163372 A1  Jun. 28, 2012

Related U.S. Application Data

(63) Continuation of application No. PCT/CN2010/075571, filed on Jul. 30, 2010.

(30) Foreign Application Priority Data

Sep. 4, 2009 (CN) .......................... 2009 1 0190153

(51) Int. Cl.
*H04L 12/66* (2006.01)
*H04W 8/10* (2009.01)
*H04L 29/12* (2006.01)

(52) U.S. Cl.
CPC .............. *H04W 8/10* (2013.01); *H04L 29/1216* (2013.01); *H04L 29/12301* (2013.01); *H04L 29/12981* (2013.01); *H04L 61/157* (2013.01); *H04L 61/2076* (2013.01); *H04L 61/609* (2013.01)
USPC ....................................................... 370/352

(58) Field of Classification Search
USPC ........................................................ 370/252
See application file for complete search history.

(56) References Cited

U.S. PATENT DOCUMENTS

| 7,508,818 | B2 | 3/2009 | Monai | |
|---|---|---|---|---|
| 2004/0078490 | A1* | 4/2004 | Anderson et al. | 709/245 |
| 2004/0243555 | A1* | 12/2004 | Bolsius et al. | 707/3 |
| 2007/0032225 | A1* | 2/2007 | Konicek et al. | 455/417 |
| 2008/0275978 | A1* | 11/2008 | Houri | 709/223 |
| 2009/0161631 | A1 | 6/2009 | Chow et al. | |
| 2009/0197621 | A1* | 8/2009 | Book | 455/457 |
| 2011/0035458 | A1* | 2/2011 | Burnim | 709/206 |

FOREIGN PATENT DOCUMENTS

| CN | 101137222 A | 3/2008 |
|---|---|---|
| CN | 101227685 A | 7/2008 |
| CN | 101355595 A | 1/2009 |
| KR | 20040099011 A | 11/2004 |
| RU | 2292089 C2 | 1/2007 |

OTHER PUBLICATIONS

International Search Report for International Patent Application No. PCT/CN2010/075571, dated Nov. 11, 2010, and English translation thereof.
Russian Office Action for Application No. 2012112375 dated Aug. 6, 2013, and its English translation thereof.

* cited by examiner

*Primary Examiner* — Huy D Vu
*Assistant Examiner* — Kevin Cunningham
(74) *Attorney, Agent, or Firm* — Harness, Dickey & Pierce, P.L.C.

(57) ABSTRACT

A method, apparatus and system for updating location information of an IP address are disclosed. The method includes: receiving an incoming call; searching a pre-stored location database for a location corresponding to the incoming call; searching a pre-stored log database for an IP address corresponding to the incoming call; and updating location information of the IP address stored in an IP database by the location searched out. The present disclosure may be applied when a service provider updates the location information of the IP address in the IP database. Thus, the problem that the location information in the IP database cannot be updated accurately in the prior art is solved.

5 Claims, 3 Drawing Sheets

METHOD, APPARATUS AND SYSTEM FOR UPDATING LOCATION INFORMATION OF AN IP ADDRESS

CROSS-REFERENCE TO RELATED APPLICATIONS

This application is a continuation of International Application No. PCT/CN2010/075571, filed on Jul. 30, 2010. This application claims the benefit and priority of Chinese Patent Application No. 200910190153.6, filed Sep. 4, 2009. The entire disclosures of each of the above applications are incorporated herein by reference.

FIELD

The present disclosure relates to to telecommunication field, and more particularly, to a method, an apparatus and a system for updating location information of an IP address.

BACKGROUND

This section provides background information related to the present disclosure which is not necessarily prior art.

IP-based services on the Internet (e.g. local weather forecast, local news and relevant security services) are provided based on location information of an IP address of a user, wherein the location information of the IP address is stored in an IP database.

Currently, the IP address of the user is usually allocated randomly when the user accesses the Internet. Therefore, the location information corresponding to the IP address may change. Therefore, in order to provide normal IP-based service to the user, the location information of the IP address stored in the IP database needs to be updated.

In the prior art, the user transmits the location information of the IP address needs to be updated to an IP database maintenance center via a network. Then, the IP database maintenance center updates the location information of the IP address stored in the IP database by the location information provided by the user.

In the update procedure of the location information of the IP address, since the update is initiated by the user, it is impossible to determine whether the location information of the IP address provided by the user is correct. Thus, the location information of the IP address cannot be updated correctly.

SUMMARY

This section provides a general summary of the disclosure, and is not a comprehensive disclosure of its full scope or all of its features.

Various embodiments provide a method, an apparatus and a system for updating location information of an IP address, so as to update the location information of the IP address accurately.

According to one embodiment, a method for updating location information of an IP address is provided. The method includes:
  receiving an incoming call;
  searching a pre-stored location database for a location corresponding to the incoming call;
  searching a pre-stored log database for an IP address corresponding to the incoming call; and
  updating location information of the IP address stored in an IP database by the location searched out.

According to another embodiment, an apparatus for updating location information of an IP address is provided. The apparatus includes:
  a receiving module, to receive an incoming call;
  a first searching module, to search a pre-stored location database for a location corresponding to the incoming call received by the receiving module;
  a second searching module, to search a pre-stored log database for an IP address corresponding to the incoming call received by the receiving module; and
  an updating module, to update location information of the IP address searched out by the second searching module stored in an IP database by the location searched out by the first searching module.

According to another embodiment, a system for updating location information of an IP address is provided. The system includes: an apparatus for updating the location information of the IP address, to receive an incoming call, search a pre-stored location database for a location corresponding to the incoming call, search a pre-stored log database for an IP address corresponding to the incoming call, and update location information of the IP address stored in an IP database by the location.

In the method, apparatus and system for updating the location information of the IP address, a location corresponding to the incoming call is found in a pre-stored location database. An IP address corresponding to the incoming call is found in the log database. Thus, it is possible to obtain the location and the IP address corresponding to the incoming call. The location of the incoming call is used to update the location information of the IP address corresponding to the incoming call stored in the IP database. Due to the accuracy of the location corresponding to the incoming call, the location information stored in the IP database is updated accurately. Thus, the problem that the location information in the IP database cannot be updated accurately in the prior art is solved.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

In order to solve the problem that location information of an IP address stored in an IP database cannot be updated accurately in the prior art, various embodiments provide a method, an apparatus and a system for updating location information of the IP address.

Figure 1:
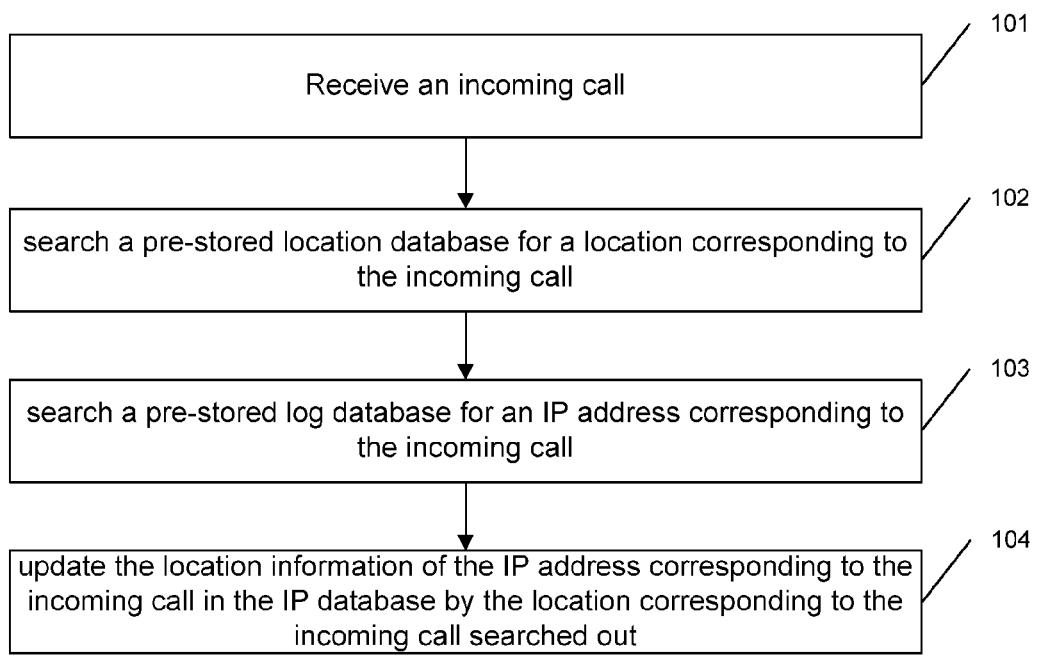
FIG. 1 is a flowchart illustrating a method for updating location information of an IP address according to a first embodiment.

FIG. 1 is a flowchart illustrating a method for updating location information of an IP address according to a first embodiment. As shown in FIG. 1, the method includes the:

At block 101, an incoming call is received.

At block 102 searches a pre-stored location database for a location corresponding to the incoming call.

In this embodiment, as shown in table 1, the location database includes a telephone number of the user and information bound with the telephone number such as user identifier and location. At block 102, it is possible to search Table 1 for the location corresponding to the telephone number of the incoming call received at block 101.

TABLE 1

| Telephone number | User identifier | Location |
|---|---|---|
| 021-2176xxxx | 123456 | Shanghai |
| 1354901xxxx | 123457 | Shanghai |
| 021-2178xxxx | 123458 | Shanghai |
| 136717xxxxx | 123459 | Shanghai |
| 1354236xxxx | 234567 | Wuhan in Hubei province |
| 1354710xxxx | 234568 | Wuhan in Hubei province |
| ... | ... | ... |

If the user is a common personal user, the user identifier is a user ID and the location is that of the telephone number. If the user is a cyber center system user, the user identifier is an ID of the cyber center system and the location is that of the cyber center system.

Hereinafter, suppose the user is a common personal user. The method for updating the location information of an IP address provided by the present disclosure will be described in further detail.

If there are multiple incoming calls, at block 101, an incoming call table as shown in Table 2 may be generated according to the information obtained from Table 1. The incoming call table may include user identifier, telephone number, receiving time and location information. In a practical application, the incoming call table may further include other information related to the incoming calls, which will not be described herein.

TABLE 2

| User identifier | Telephone number | Receiving time | Location |
|---|---|---|---|
| 123456 | 021-2176xxxx | May 1, 2009 | Shanghai |
| 123457 | 1354901xxxx | May 1, 2009 | Shanghai |
| 123458 | 021-2178xxxx | May 1, 2009 | Shanghai |
| 123459 | 136717xxxxx | May 1, 2009 | Shanghai |

TABLE 2-continued

| User identifier | Telephone number | Receiving time | Location |
|---|---|---|---|
| 234567 | 1354236xxxx | May 1, 2009 | Wuhan in Hubei province |
| 234568 | 1354710xxxx | May 1, 2009 | Wuhan in Hubei province |

Block 103 searches a pre-stored log database for an IP address corresponding to the incoming call.

In this example, the log database may be as shown in table 3, including information such as user identifier, IP address, logon location and logon time. When there are multiple incoming calls, block 103 may obtain multiple IP addresses corresponding to the user identifiers and the incoming calls recorded in the incoming call table from the log database shown in Table 3 according to the incoming call table shown in Table 2.

TABLE 3

| User identifier | IP address | Logon spot | Logon time |
|---|---|---|---|
| 123456 | 123.234.111.1 | unknown | May 1, 2009 |
| 123456 | 123.234.111.3 | Shanghai | May 1, 2009 |
| 123456 | 123.234.111.2 | Shandong | May 1, 2009 |
| 123457 | 123.234.111.1 | unknown | May 1, 2009 |
| 123458 | 123.234.111.2 | Shandong | May 1, 2009 |
| 123459 | 123.234.111.2 | Shandong | May 1, 2009 |
| 234567 | 202.114.0.231 | unknown | May 1, 2009 |
| 234568 | 202.114.0.231 | unknown | May 1, 2009 |

Block 104 updates the location information of the IP address corresponding to the incoming call in the IP database by the location corresponding to the incoming call searched out at block 102. In this embodiment, the location is the location of the telephone number of the incoming call.

Figure 2:
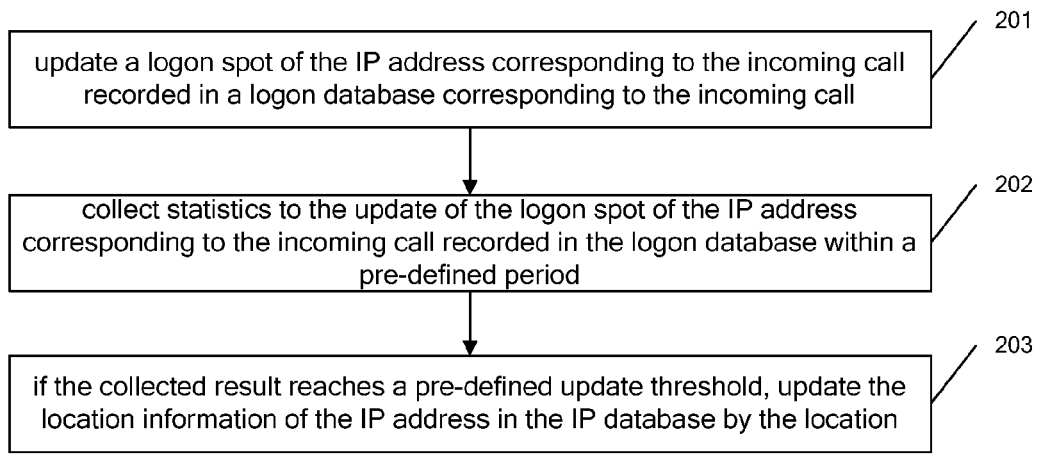
FIG. 2 is a flowchart illustrating block 103 of FIG. 1.

As shown in FIG. 2, block 104 may specifically include the following steps.

Block 201 updates a logon spot of the IP address corresponding to the incoming call recorded in the log database searched out at block 103 by the location corresponding to the incoming call searched out at block 102.

For example, according to the incoming call table as shown in Table 2, an updated result of the logon spot in the log database shown in Table 3 may be as shown in table 4.

TABLE 4

| User identifier | IP address | Logon spot | Logon time |
|---|---|---|---|
| 123456 | 123.234.111.1 | Shanghai | May 1, 2009 |
| 123456 | 123.234.111.3 | Shanghai | May 1, 2009 |
| 123456 | 123.234.111.2 | Shanghai | May 1, 2009 |
| 123457 | 123.234.111.1 | Shanghai | May 1, 2009 |
| 123458 | 123.234.111.2 | Shanghai | May 1, 2009 |
| 123459 | 123.234.111.2 | Shanghai | May 1, 2009 |
| 234567 | 202.114.0.231 | Wuhan in Hubei province | May 1, 2009 |
| 234568 | 202.114.0.231 | Wuhan in Hubei province | May 1, 2009 |

Block 202 collects statistics to the update of the logon spot of the IP address corresponding to the incoming call recorded in the log database searched out at block 103 within a predefined period.

Generally, the location of the IP address may change every three days. The period for collecting the statistics may be configured according to the frequency that the location of the IP address changes, e.g. 1 day, 2 days or 3 days. In this embodiment, suppose the period is 1 day.

At block 202 of this embodiment, it is possible to collect statistics to the times that the logon spot of the IP address is updated in the log database. It is also possible to collect statistics to weighted values of the times that the logon spot of the IP address is updated in the log database.

Hereinafter, suppose that the statistics are collected according to the weighted values of the times that the logon spot of the IP address is updated in the log database within one day (2009 May 1).

1. Obtain a weight corresponding to the incoming call received at block 101 from a pre-stored weight table.

The weight table may be as shown in Table 5, including telephone numbers of users and weights corresponding to the telephone numbers.

TABLE 5

| Telephone number | weight |
|---|---|
| 021-2176xxxx | 1 |
| 1354901xxxx | 1 |
| 021-2178xxxx | 1 |
| 136717xxxxx | 0.5 |
| 1354236xxxx | 0.5 |
| 1354710xxxx | 0.5 |
| ... | ... |

In this embodiment, in order to ensure the accuracy of the update of the location of the IP address, a configuration principle of the weight corresponding to the telephone number is as follows: a weight of a fixed-line phone is larger than that of a mobile phone. In this embodiment, detailed values corresponding to the specific numbers are not restricted.

2. Collect statistics to a weighted value of the times that the IP address is updated in the log database within one day (2009 May 1) according to the weight corresponding to the incoming call and record the weighted times as a collected result.

For example, it is known from Table 3 and Table 4 that the logon spot of IP address 123.234.111.1 in the log database is updated twice within one day (2009 May 1), wherein one update is performed according to the location (Shanghai) provided by fixed-line telephone 021-2176xxxx of a user with user identifier 123456, and the other update is performed according to location (Shanghai) provided by mobile phone 1354901xxxx of a user with user identifier 123457. According to the weight table shown in Table 5, it is found that the weight corresponding to the incoming call 021-2176xxxx is 1, and the weight corresponding to the incoming call 1354901xxxx is 0.5. Therefore, the weighted value of the updated times of logon spot of the IP address 123.234.111.1 in the log database within one day (2009 May 1) is 1*1+ 1*0.5=1.5, i.e. the collected result is 1.5.

Similarly, according to Table 2 and Table 5, the collected results of the weighted values of the updated times of the IP addresses in the log database within one day (2009 May 1) are as shown in Table 6.

TABLE 6

| IP address | Changed logon spot | Updated times | Weighted update times |
|---|---|---|---|
| 123.234.111.1 | Shanghai | 2 | 1 × 1 + 1 × 0.5 = 1.5 |
| 123.234.111.2 | Shanghai | 3 | 1 × 1 + 1 × 1 + 1 × 0.5 = 2.5 |
| 202.114.0.231 | Wuhan in Hubei province | 2 | 1 × 0.5 + 1 × 0.5 = 1 |

It should be noted that, if one IP address in the log database is updated by different logon spots, statistics will not be collected to the update of the IP address and subsequent update operations is stopped. Alternatively, statistics are collected respectively with respect to the update of each logon spot of the IP address in the log database, and save statistical information corresponding to the logon spot with a largest statistic value or the logon spot whose collected result reaches a pre-defined threshold. In the subsequent update procedure, this logon spot and the statistical information are used to update the location information of the IP address in the IP database.

Block 203, if the collected result of block 202 reaches a pre-defined update threshold, update the location information of the IP address found at block 103 in the IP database by the location found at block 102.

In this embodiment, the update threshold may be configured according to a practical requirement. For example, the update threshold may be configured to be 1. Then, if the collected result of block 202 (the collected result of the update times, or the collected result of the weighted update times) is larger than 1, at block 203, the location information of the IP address obtained at block 102 is updated by the location obtained at block 101.

For example, it is known from Table 6 that, when the update threshold is 1, the location information of three IP address shown in Table 6 may be updated. At this time, the location information of the three IP addresses in the IP database may be updated according to the changed logon spot recorded in Table 6.

Certainly, in a practical application, block 104 may update the location information of the IP address obtained at block 103 by the location obtained at block 102 through other methods. For example, block 104 may not collect statistics to the updates of the IP address. If it is determined that the location of the IP address changes according to the location of the incoming call, the location information of the IP address is directly updated by the location of the telephone number. The detailed process is not described herein.

In the method for updating the location of the IP address, the location corresponding to the incoming call can be found in the location database and the IP address corresponding to the incoming call can be found in the log database. The location information corresponding to the IP address in the IP database is updated by the location corresponding to the incoming call. Thus, the location information of the IP address in the IP database can be updated accurately. Since the period for collecting the statistics may be configured according to a practical requirement, the location information of the IP address may be updated according to the collected result within the period. The embodiment is able to update the location information of the IP address in the IP database more accurately.

Figure 3:
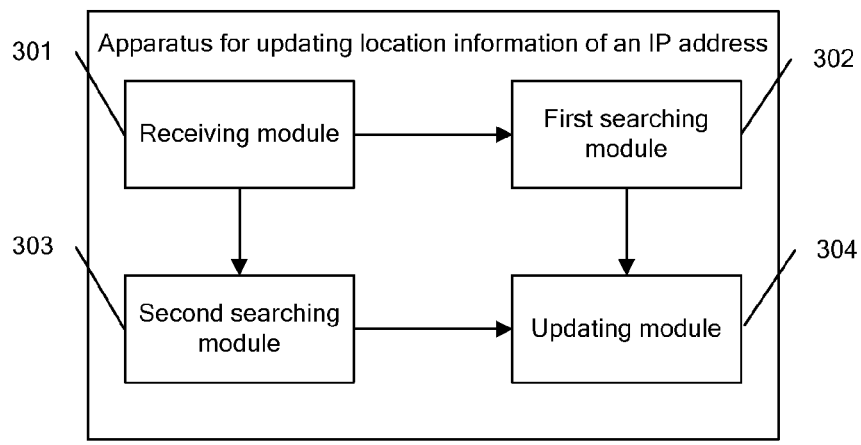
FIG. 3 is a schematic diagram illustrating a structure of an apparatus for updating location information of an IP address according to a second embodiment.

As shown in FIG. 3, a second embodiment provides an apparatus for updating location information of an IP address. The apparatus includes: a receiving module 301, a first searching module 302, a second searching module 303 and an updating module 304.

The receiving module 301 is to receive an incoming call.

The first searching module 302 is to search a pre-stored location database for a location corresponding to a telephone number of the incoming call received by the receiving module 301.

In this embodiment, the location database may be as shown in Table 1. The first searching module 302 may find a location corresponding to the telephone number of the incoming call received by receiving module 301 from Table 1.

When the receiving module 301 receives multiple incoming calls, the first searching module 302 configures an incoming call table according to location information searched out. The incoming call table is as shown in Table 2.

The second searching module 303 is to search a pre-stored log database for an IP address corresponding to the incoming call received by the receiving module 301.

In this example, the log database is as shown in Table 3. The second searching module 303 may first obtain a user identifier corresponding to the incoming call according to the incoming call table shown in Table 2 and then search the Table 3 for the corresponding IP address according to the user identifier.

The updating module 304 is to update location information stored in an IP database corresponding to the IP address searched out by the second searching module 303 by the location searched out by the first searching module 302.

Figure 4:
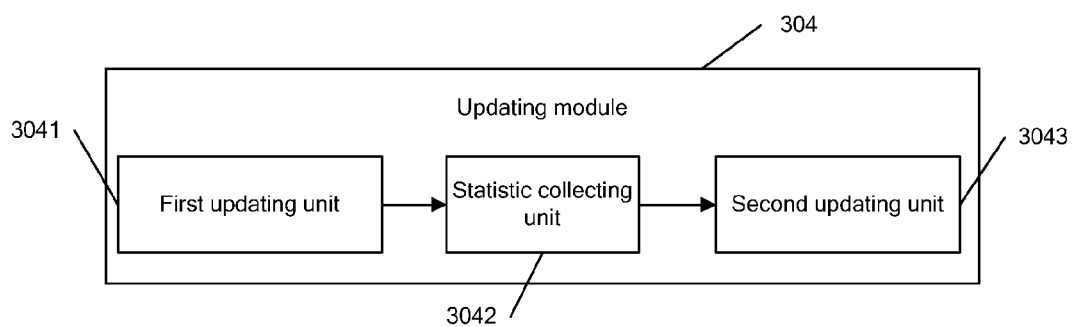
FIG. 4 is a schematic diagram illustrating the updating module in FIG. 3.

As shown in FIG. 4, the updating module 304 may further include: a first updating unit 3041, a statistic collecting unit 3042 and a second updating unit 3043.

The first updating unit 3041 is to update a logon spot recorded in the log database corresponding to the IP address searched out by the second searching module 303 by the location searched out by the first searching module 302.

The statistic collecting unit 3042 is to collect statistics to the update of the logon spot of the IP address searched out by the second searching module 303 within a pre-defined period to obtain a collected result.

In this embodiment, the period may be configured according to a practical update requirement of the location of the IP address. Generally, the location of the IP address may change every 3 days. The period may be configured according to the frequency that the location of the IP address changes, e.g. 1 day, 2 days or 3 days.

The statistic collecting unit 3042 may collect statistics to the updated times of the logon spot of the IP address in the log database, or collect statistics to weighted update times of the logon spot of the IP address in the log database. The details may be obtained from block 202 shown in FIG. 2.

The second updating unit 3043 is to update, when the collected result of the statistic collecting unit 3042 reaches a pre-defined update threshold, the location information of the IP address searched out by the second searching module 303 by the location searched out by the first searching module 302.

Figure 5:
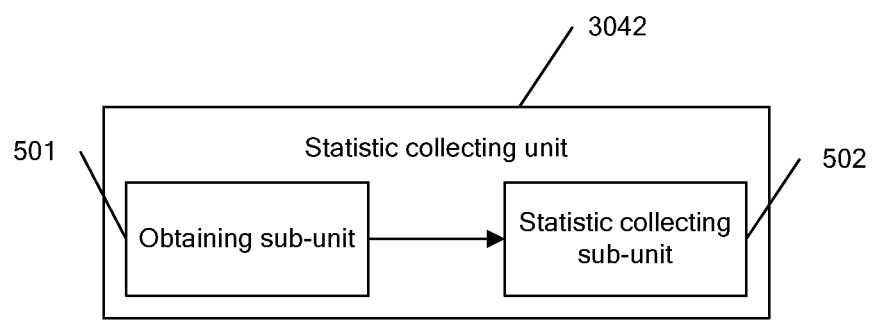
FIG. 5 is a schematic diagram illustrating the statistic collecting unit in FIG. 4.

As shown in FIG. 5, the statistic collecting unit 3042 may further include: an obtaining sub-unit 501 and a statistic collecting sub-unit 502.

The obtaining sub-unit 501 is to obtain a weight corresponding to the incoming call received by the receiving module 301 from a pre-stored weight table.

In this embodiment, the weight table may be as shown in Table 5. In order to ensure the accuracy of the update of the location of the IP address, a configuration principle of the weight corresponding to the telephone number may be as follows: the weight of the fixed-line telephone is larger than that of a mobile phone. In this example, the detailed weights are not defined.

The statistic collecting sub-unit 502 is to collect statistics to weighted update times of the logon spot of the IP address in the log database within the pre-defined period according to the weight corresponding to the incoming call obtained by the obtaining sub-unit 501, and record the weighted update times as a collected result.

In the embodiment, the apparatus for updating the location of the IP address may be an IP database maintenance center of a service provider.

The detailed application of the apparatus for updating the location of the IP address provided by the embodiment may be obtained from the method for updating the location of the IP address and will not be repeated herein.

In the apparatus for updating the location of the IP address, the location corresponding to the incoming call can be found in the location database and the IP address corresponding to the incoming call can be found in the log database. The location information corresponding to the IP address in the IP database is updated by the location corresponding to the incoming call. Thus, the location information of the IP address in the IP database can be updated accurately. Since the period for collecting the statistics may be configured according to a practical requirement, the location information of the IP address may be updated according to the collected result within the period. The embodiment is able to update the location information of the IP address in the IP database more accurately.

A third embodiment provides a system for updating location of an IP address. The system includes:

an apparatus for updating the location of the IP address, to receive an incoming call, search a pre-stored location database for a location corresponding to the incoming call, search a pre-stored log database for an IP address corresponding to the incoming call, and update location information of the IP address in an IP address database by the location.

The apparatus for updating the location of the IP address has the same internal structure with the apparatus for updating the location of the IP address in the second embodiment and will not be repeated herein.

The detailed application of the system for updating the location of the IP address provided by this embodiment may be obtained from the method for updating the location of the IP address provided by the first embodiment and will not be repeated herein.

In the system for updating the location of the IP address, the location corresponding to the incoming call can be found in the location database and the IP address corresponding to the incoming call can be found in the log database. The location information corresponding to the IP address in the IP database is updated by the location corresponding to the incoming call. Thus, the location information of the IP address in the IP database can be updated accurately, which solves the problem that the location information of the IP address in the IP database cannot be updated accurately in the prior art.

The method, apparatus and system for updating location of the IP address provided by the various embodiments may be applied when the service provider updates location information of the IP address in the IP database.

One with ordinary skill in the art would recognize that all or some steps in the method provided by the embodiment may be a software program on a relevant hardware. The program may be stored in a computer-readable medium, e.g. ROM/RAM, disk or CD.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for updating location information of an IP address, comprising:
   receiving an incoming call from a user;
   searching a pre-stored location database for a location corresponding to the incoming call according to a telephone number corresponding to the incoming call of the user, wherein the location database includes the telephone number of the user, a user identifier and the location corresponding to the telephone number;
   searching a pre-stored log database for an IP address corresponding to the incoming call according to the user identifier, wherein the log database includes the user identifier, the IP address of the user, a logon spot, and logon time; and
   updating location information of the IP address stored in an IP database according to the location corresponding to the incoming call; further comprising
   updating the logon spot of the IP address recorded in the log database according to the location corresponding to the incoming call;
   within a pre-defined period, collecting statistics to update times of the logon spot of the IP address in the log database to obtain a collected result; and
   if the collected result reaches a pre-defined threshold, updating the location information of the IP address in the IP database according to the location corresponding to the incoming call.

2. The method of claim 1, wherein the collecting statistics to the update times of the logon spot of the IP address stored in the IP database according to the location corresponding to the incoming call within the pre-defined period comprises:
   obtaining a weight corresponding to the incoming call from a pre-stored weight table; and
   according to the weight corresponding to the incoming call, collecting statistics to weighted update times of the logon spot of the IP address in the log database within the pre-defined period and recording the weighted update times as the collected result.

3. An apparatus for updating location information of an IP address, comprising:
   one or more processors;
   a memory; and
   wherein one or more program modules are stored in the memory and to be executed by the one or more processors, the one or more program modules comprise:
   a receiving module, to receive an incoming call from a user;
   a first searching module, to search a pre-stored location database for a location corresponding to the incoming call received by the receiving module according to a telephone number corresponding to the incoming call of the user, wherein the location database comprises the telephone number of the user, a user identifier and the location corresponding to the telephone number;
   a second searching module, to search a pre-stored log database for an IP address corresponding to the incoming call received by the receiving module according to the user identifier, wherein the log database comprises the user identifier, the IP address of the user, a logon spot, and logon time; and
   an updating module, to update location information of the IP address searched out by the second searching module stored in an IP database according to the location corresponding to the incoming call by the first searching module;
   wherein the updating module comprises:
   a first updating unit, to update the logon spot of the IP address searched out by the second searching module recorded in the log database according to the location corresponding to the incoming call by the first searching module;
   a statistic collecting module, to collect statistics, within a pre-configured period, to updates of the logon spot of the IP address searched out by the second searching module in the log database performed by the first updating unit and obtain a collected result; and
   a second updating unit, to update, if the collected result reaches a pre-defined threshold, location information of the IP address searched out by the second searching module in the IP database according to the location corresponding to the incoming call by the first searching module.

4. The apparatus of claim 3, wherein the statistic collecting module comprises:
   an obtaining sub-unit, to obtain a weight corresponding to the incoming call received by the receiving module from a pre-stored weight table; and
   a statistic collecting sub-unit, to collect statistics, within the pre-defined period, to weighted update times of the logon spot of the IP address in the log database according to the weight corresponding to the incoming call obtained by the obtaining sub-unit, and record the weighted update times as the collected result.

5. A non-transitory machine readable storage medium, comprising a set of instructions for implementing updating location information of an IP address, the set of instructions to direct at least one processor to perform acts of:
   receiving an incoming call from a user;
   searching a pre-stored location database for a location corresponding to the incoming call according to a telephone number corresponding to the incoming call of the user, wherein the location database comprises the telephone number of the user, a user identifier and the location corresponding to the telephone number;
   searching a pre-stored log database for an IP address corresponding to the incoming call according to the user identifier, wherein the log database comprises the user identifier, the IP address of the user, a logon spot, and logon time; and
   updating location information of the IP address stored in an IP database according to the location corresponding to the incoming call;
   wherein the updating the location information of the IP address stored in the IP database according to the location corresponding to the incoming call comprises:
   updating the logon spot of the IP address recorded in the log database according to the location corresponding to the incoming call;
   within a pre-defined period, collecting statistics to update times of the logon spot of the IP address in the log database to obtain a collected result; and
   if the collected result reaches a pre-defined threshold, updating the location information of the IP address in the IP database according to the location corresponding to the incoming call.

* * * * *